United States Patent [19]
Fujinami

[11] Patent Number: 5,933,398
[45] Date of Patent: *Aug. 3, 1999

[54] APPARATUS FOR REPRODUCING RECORDING MEDIUM WITH SYNTHESIS METHOD AND DEFAULT VALUE AND METHOD THEREFOR

[75] Inventor: Yasushi Fujinami, Kanagawa, Japan

[73] Assignee: Sony Corporation, Tokyo, Japan

[ * ] Notice: This patent is subject to a terminal disclaimer.

[21] Appl. No.: 08/925,788

[22] Filed: Sep. 9, 1997

Related U.S. Application Data

[63] Continuation of application No. 07/904,448, Jun. 25, 1992, Pat. No. 5,715,224.

[30] Foreign Application Priority Data

Jul. 5, 1991 [JP] Japan ................................. P3-190824
Jul. 5, 1991 [JP] Japan ................................. P3-190931

[51] Int. Cl.⁶ ...................................................... G11B 7/00
[52] U.S. Cl. ................................................. 369/49; 369/47
[58] Field of Search ............................... 369/58, 49, 48, 369/54, 124, 47; 306/1, 95, 96, 98; 348/423

[56] References Cited

U.S. PATENT DOCUMENTS

| | | | |
|---|---|---|---|
| 4,142,209 | 2/1979 | Hedlund et al. | 358/128 |
| 4,761,692 | 8/1988 | Yoshida et al. | 358/335 |
| 4,791,495 | 12/1988 | Umemoto et al. | 358/310 |
| 4,872,068 | 10/1989 | Ishii et al. | 358/342 |
| 5,130,863 | 7/1992 | Yamashita et al. | 360/48 |
| 5,218,454 | 6/1993 | Nagawasa et al. | 358/343 |
| 5,233,478 | 8/1993 | Kanota | 360/21 |
| 5,331,423 | 7/1994 | Ota et al. | 358/342 |
| 5,715,224 | 2/1998 | Fujinami | 369/58 |

FOREIGN PATENT DOCUMENTS

| | | |
|---|---|---|
| 0292917 A1 | 11/1988 | European Pat. Off. . |
| 0303700 A1 | 2/1989 | European Pat. Off. . |
| 0380323 A1 | 8/1990 | European Pat. Off. . |
| 0381807 A2 | 8/1990 | European Pat. Off. . |

Primary Examiner—Thang V. Tran
Attorney, Agent, or Firm—Limbach & Limbach L.L.P.

[57] ABSTRACT

An information recording medium and a reproducing device therefor which can realize varied reproduction from data recorded with plural channels and improve the operability. TOC information is recorded at a start point of a disk (1), and in succession thereto plural kinds of information are recorded on tracks #1 to #5. Video data, audio data and superimpose data each having plural channels are time-division multiplexed and recorded on each track. A default value relating to a synthesis method for the plural channels is recorded as one of the TOC information or at a header portion of each block of the video data, the audio data and the superimpose data. In another aspect, data in each of plural channels recorded in the disk (1) is supplied through decoders (8) to (10) to a synthesizers (11) or (12). A default corresponding to a predetermined channel is stored in a nonvolatile memory (16), and the default channel is automatically selected by the synthesizer (11) or (12).

8 Claims, 13 Drawing Sheets

FIG. 9

| SOFTWARE CATEGORY NUMBER | CATEGORY |
|---|---|
| 0 | MOVIE |
| 1 | KARAOKE |
| 2 | MUSIC |
| ~ | ~ |

FIG. 10

| IDENTIFIER | CONTENTS |
|---|---|
| 0, 1 | STEREO ACCOMPANIMENT |
| 2 | GUIDE |
| 3 | MODEL |
| 4 | COMMENTS |

FIG. 11

| IDENTIFIER | CONTENTS |
|---|---|
| 0, 1 | BACKGROUND SOUND (L, R) |
| 2 | CENTER SOUND |
| 3 | BACK SOUND |
| 4 | SPEECH |
| 5 | COMMENTS |

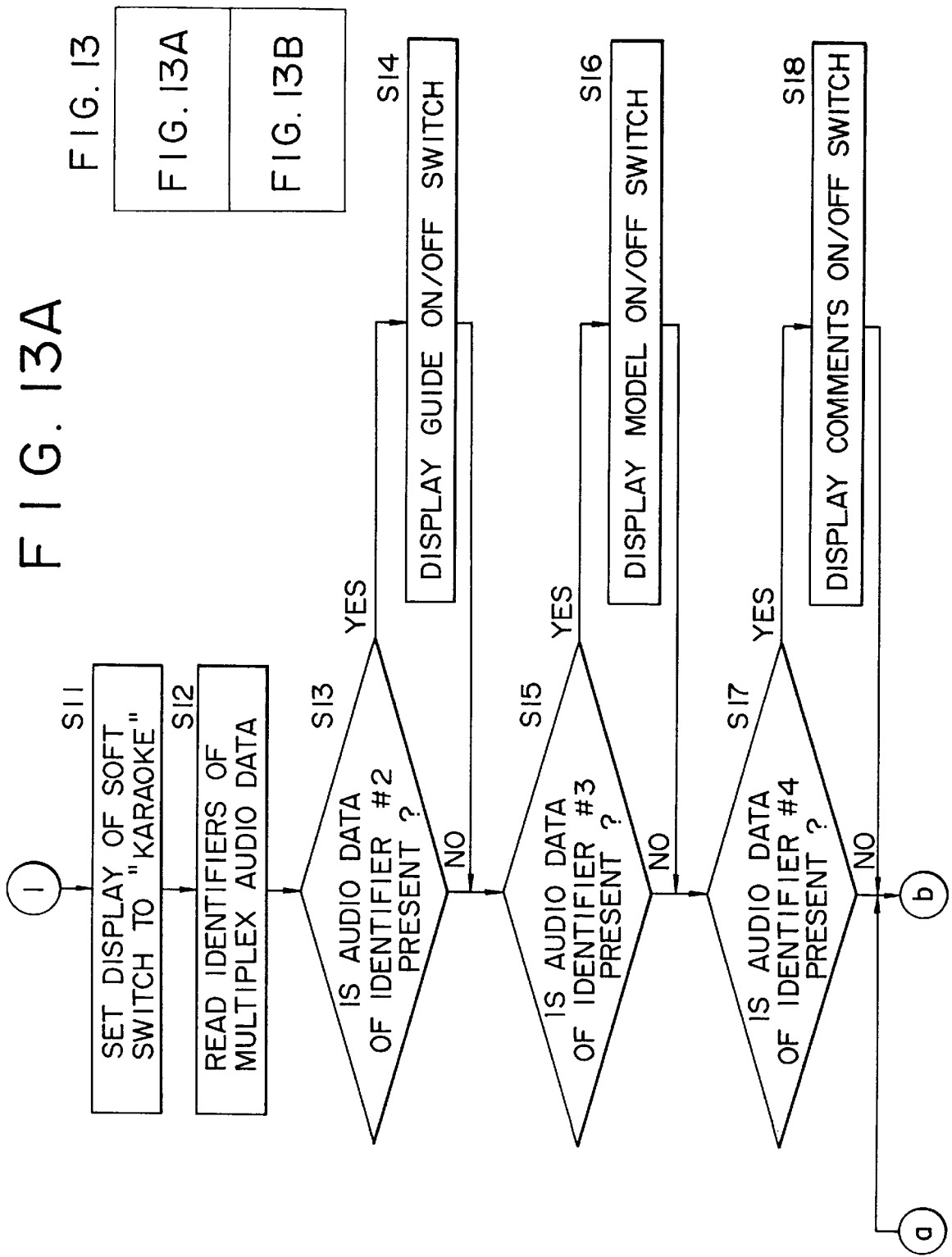

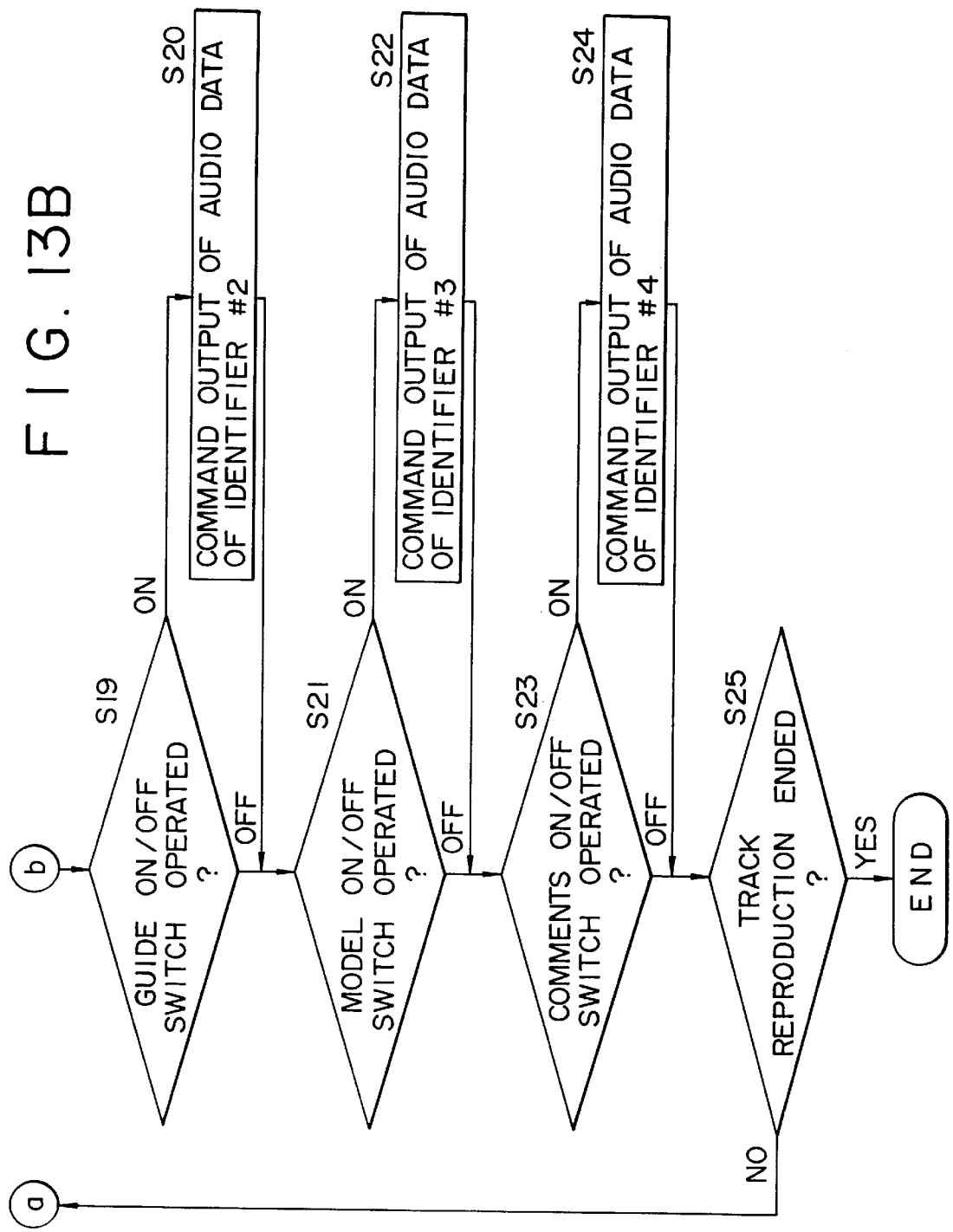

F I G. 14

| GUIDE | ON/OFF |
|---|---|
| MODEL | ON/OFF |
| COMMENTS | ON/OFF |

~15(17)

F I G. 15

| IDENTIFIER | 0 | 1 | 2 | 3 | ~ |
|---|---|---|---|---|---|
| CONTENTS | ENGLISH | FRENCH | GERMAN | JAPANESE | ~ |

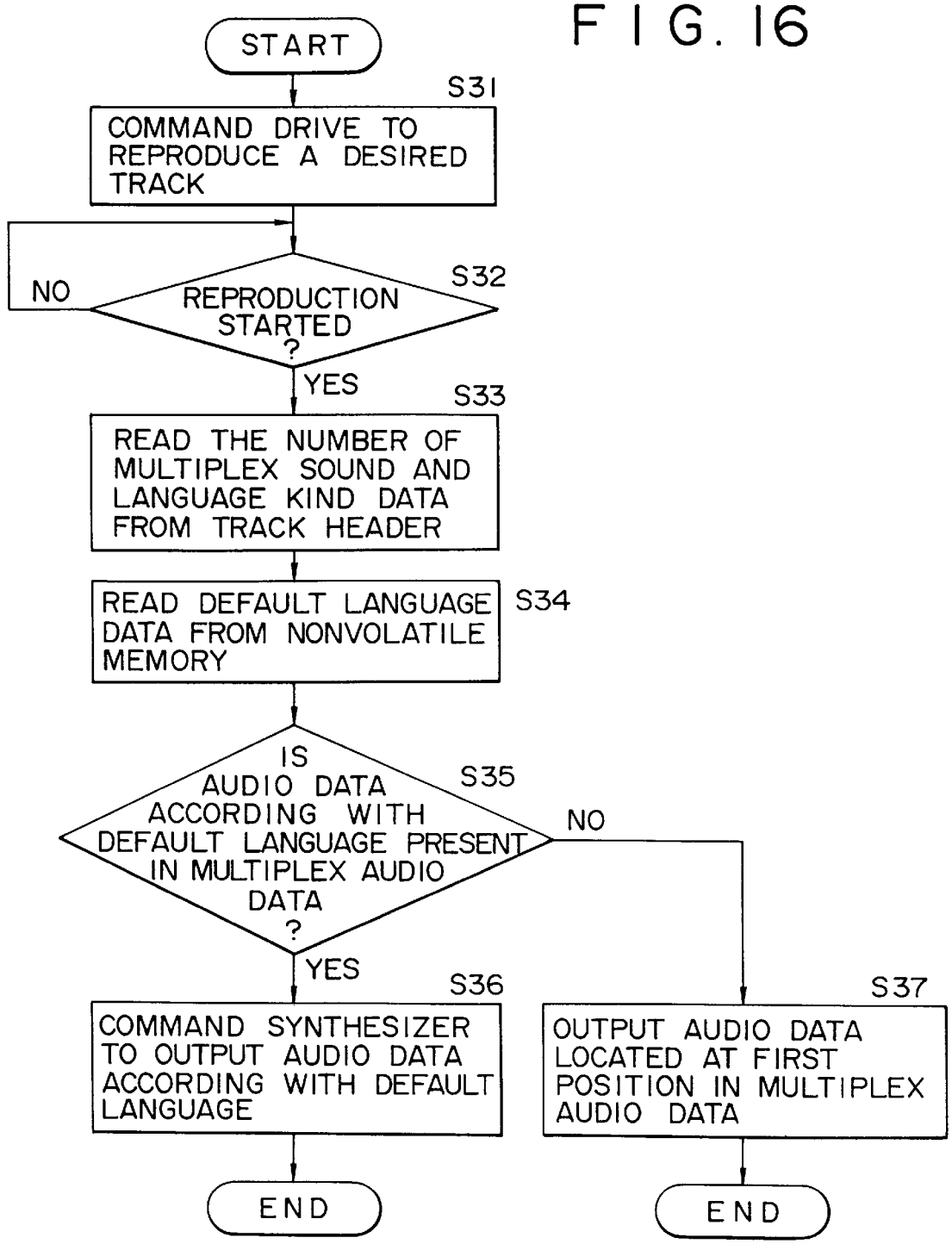

5,933,398

APPARATUS FOR REPRODUCING RECORDING MEDIUM WITH SYNTHESIS METHOD AND DEFAULT VALUE AND METHOD THEREFOR

This is a continuation of application Ser. No. 07/904,448, filed Jun. 25, 1992, now U.S. Pat. No. 5,715,224.

BACKGROUND OF THE INVENTION

The present invention relates to an information recording medium such as a compact disk, video disk and magneto-optical disk, and also relates to a reproducing device for reproducing information recorded in such an information recording medium.

In a conventional optical video disk as an example of an information recording medium, video signals of one channel and audio signals of two channels or four channels are recorded. As to the audio signals, the two channels are recorded as FM audio signals, and the other two channels are recorded as PCM audio signals. In reproduction, the video signals and the FM audio signals are reproduced, or the video signals and the PCM audio signals are reproduced.

As mentioned above, with regard to the video signals, only one channel is recorded in the conventional video disk. Accordingly, varied images cannot be reproduced.

On the other hand, with regard to the audio signals, either the FM audio signals or the PCM audio signals may be selected; one of the two channels of the selected audio signals may be muted; and the two channels may be synthesized to be output as monophonic audio signals. Thus, a variation in sound to be reproduced is limited.

Meanwhile, a video disk includes various categories of software such as movie, music, karaoke (accompaniment for singing), etc. In case of movie, video signals for the movie and audio signals associated therewith are recorded; in case of music, audio signals for the music and video signals for images associated therewith are recorded; and in case of karaoke, stereophonic (L and R) accompaniment, model vocal sound, images containing words associated therewith, etc. are recorded. A user must operate a switch or the like as required according to the contents of the software to select a desired signal.

In the prior art information reproducing device, the user must manually check and select a desired one of audio signals of plural kinds, for example. Accordingly, the user must preliminarily reproduce the disk on trial and operate the switch many times, so as to check what audio signals are recorded in the disk. This is a limitation the operability of the reproducing device.

SUMMARY OF THE INVENTION

It is accordingly an object of the present invention to realize varied reproduction from data recorded with plural channels.

It is another object of the present invention to improve the operability.

A first aspect of the information recording medium according to the present invention is characterized in that a default synthesis method for plural channels is recorded as TOC (Table Of Contents) information at a start point of the information recording medium or as control information at a header portion of a track.

A first aspect of the information reproducing device according to the present invention is characterized in that it is provided with decoding means for decoding digital information of each of plural channels, synthesizing means for synthesizing the information of each channel decoded by the decoding means, and changing means for changing a synthesis method for each channel in the synthesizing means into a synthesis method different from a default synthesis method.

In a preferred embodiment (described with reference to FIG. 1) of the information reproducing device according to the first aspect of the present invention, the decoding means comprises decoders 5, 6 and 7, an audio decoder 8, a video decoder 9, and a data decoder 10; the synthesizing means comprises synthesizers 11 and 12; and the changing means comprises a controller 13 and an input device 14.

In the first aspect of the information recording medium according to the present invention, a default synthesis method for plural channels is recorded at a start point of the information recording medium or at a header portion of a track. Accordingly, digital information of the plural channels can be reproduced according to a preset pattern corresponding to the default synthesis method. Furthermore, the pattern can be changed as required to thereby effect varied reproduction.

In the first aspect of the information reproducing device according to the present invention, a synthesis method for each channel in the synthesizing means can be set to a default synthesis method previously recorded in an information recording medium. Furthermore, the synthesis method for each channel in the synthesizing means can be changed according to a synthesis method different from the default synthesis method by the changing means. Accordingly, it is possible to obtain a reproduced image corresponding to not only a preset pattern but also various patterns changed from the preset pattern.

As described above, according to the first aspect of the information recording medium of the present invention, a default synthesis method for plural channels is recorded at a start point of the information recording medium or at a header portion of a track. Accordingly, a synthesis method according to a preset pattern can be realized quickly and reliably. Furthermore, a given pattern can be changed as required to thereby effect varied reproduction.

Further, according to the first aspect of the information reproducing device of the present invention, information of each channel can be synthesized by a default synthesis method previously recorded in an information recording medium. Furthermore, the default synthesis method can be changed as required. Accordingly, an image can be reproduced according to not only a preset pattern but also varied patterns.

A second aspect of the information recording medium according to the present invention is characterized in that the recording medium contains codes (e.g., numbers) representing kinds of information (e.g., movie, karaoke, music, etc., or in case of karaoke, stereophonic accompaniment, guide, model, comments, etc.) recorded in the medium.

A second aspect of the information reproducing device according to the present invention is characterized in that it is provided with reading means for reading codes representing kinds of information and setting means for setting an operation mode according to a reading result of the reading means.

In a preferred embodiment (described with reference to FIG. 1) of the information reproducing device according to the second aspect of the present invention, the reading means comprises a decoder 3, decoders 4 to 7, audio decoders 8a to 8c, video decoders 9a to 9c, and data decoders 10a to 10c; and the setting means comprises a controller 13.

A third aspect of the information reproducing device according to the present invention is characterized in that it is provided with storing means for storing designation information for designating audio information to be reproduced, reading means for reading codes representing kinds of audio information, and reproducing means for reproducing the audio information designated by the designation information from plural kinds of audio information.

In a preferred embodiment (described with reference to FIG. 1) of the information reproducing device according to the third aspect of the present invention, the storing means comprises a nonvolatile memory 16; the reading means comprises a decoder 3, decoders 4 to 7, audio decoders 8a to 8c, video decoders 9a to 9c, and data decoders 10a to 10c; and the reproducing means comprises a synthesizer 11 and a controller 13.

In the second aspect of the information recording medium according to the present invention, codes representing kinds of information such as movie, karaoke, music, etc. are recorded as TOC information, for example. Accordingly, automatic reading of the kinds of information can be effected to thereby improve the operability.

In the second aspect of the information reproducing device according to the present invention, kinds of information are read, and an operation mode necessary for reproduction of the information is set according to a result of reading, thereby improving the operability.

In the third aspect of the information reproducing device according to the present invention, audio information designated as a default is selected from audio information of plural kinds, and the audio information thus selected is reproduced. Accordingly, in case of manufacturing an information reproducing device for reproducing an information recording medium in which plural kinds of language information such as Italian, French, English, German, etc. are multiplexedly recorded, a construction of the products to be used in any countries may be made common provided that the default is to be changed and set for every destination country.

As described above, according to the second aspect of the information recording medium of the present invention, codes representing kinds of information recorded are recorded in the recording medium. Accordingly, the operability can be improved in reproduction of the recording medium.

Further, according to the second aspect of the information reproducing device of the present invention, codes representing kinds of information recorded are read, and an operation mode is set according to a result of reading. Accordingly, the user need not preliminarily check the information recorded in the recording medium as by test reproduction, thereby improving the operability.

According to the third aspect of the information reproducing device of the present invention, audio information designated as a default is selected from plural kinds of audio information, and the audio information thus selected is reproduced. Accordingly, the predetermined audio information selected from various audio information can be always reproduced. Further, any other audio information can also be reproduced as desired by changing the default.

Additionally, in case of recorded movies, for example, wherein audio data is multiplexedly recorded as comments for a visually handicapped person, the comments can be always automatically reproduced by setting the comments of audio data as part of the default. Accordingly, the visually handicapped person need not operate the device to manually select the comments each time. Further, in the case that superimpose data is multiplexedly recorded as comments for an aurally handicapped person, the comments can be always automatically reproduced by setting the comments of superimpose data as part of the default. Accordingly, the aurally handicapped person can also easily enjoy the movie.

Other objects and features of the invention will be more fully understood from the following detailed description and appended claims when taken with the accompanying drawings.

BRIEF DESCRIPTION OF THE DRAWINGS

FIG. 9 is a table of software category numbers recorded in the disk shown in FIG. 8;

FIG. 10 is a table of identifiers recorded in the disk shown in FIG. 8 in the case that the software category in the disk is karaoke;

FIG. 11 is a table of identifiers recorded in the disk shown in FIG. 8 in the case that the software category in the disk is movie;

FIGS. 12, 13A and 13B are together is a flowchart illustrating the operation of the third preferred embodiment in the case that the karaoke is recorded in the disk shown in FIG. 7;

FIG. 14 is an illustration of a display example on a display shown in FIG. 7;

FIG. 15 is a table of identifiers recorded in the disk shown in FIG. 8 in the case that audio data recorded in the disk is translated in various languages; and FIG. 16 is a flowchart illustrating the operation of the third preferred embodiment in the case that the identifiers as shown in FIG. 15 are recorded in the disk.

DETAILED DESCRIPTION OF THE PREFERRED EMBODIMENTS

Figure 1:
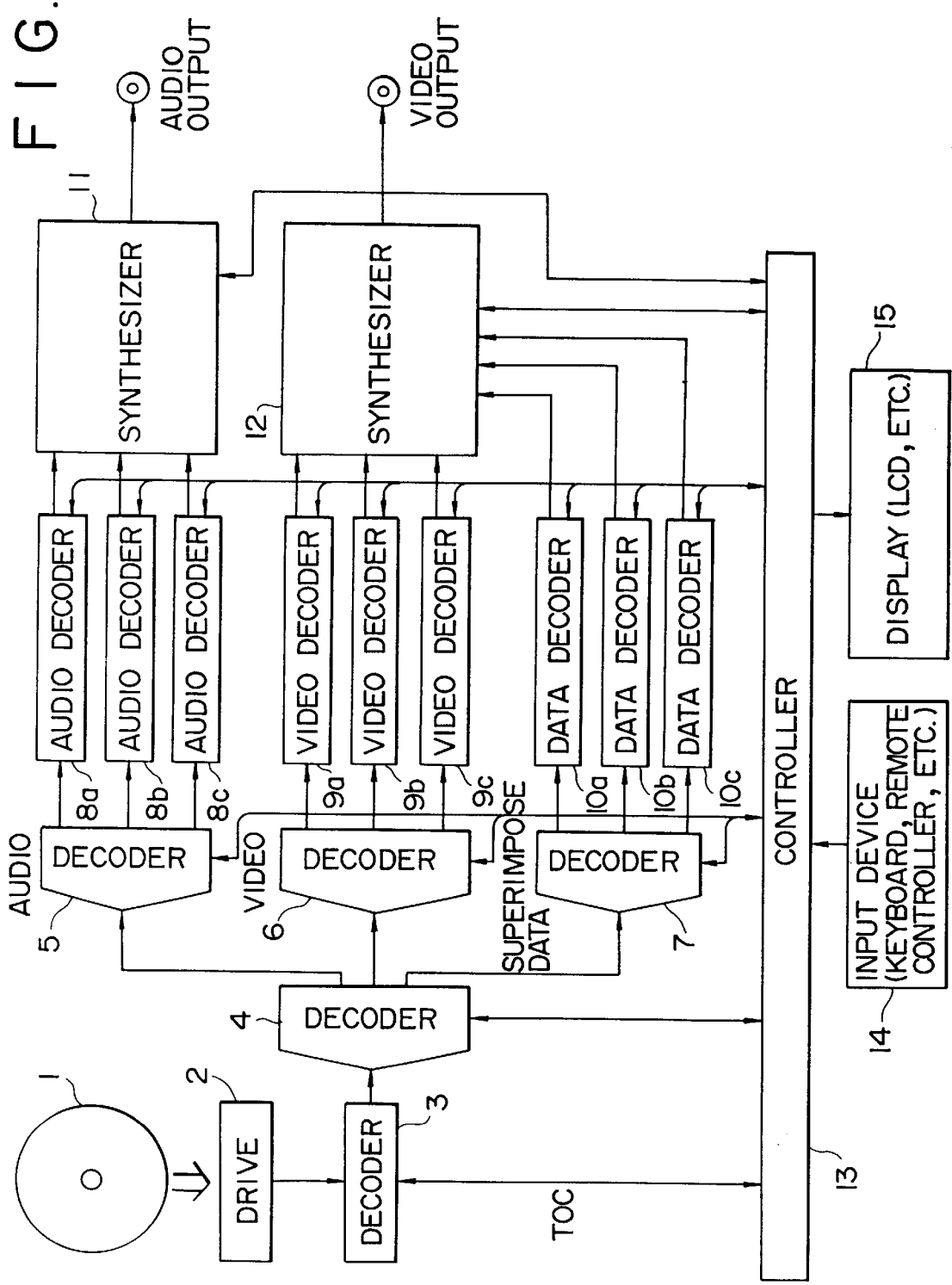
FIG. 1 is a block diagram showing a construction of a first preferred embodiment of the information reproducing device according to the present invention.

FIG. 1 is a block diagram showing a construction of a first preferred embodiment of the information reproducing device according to the present invention. A disk 1 is driven by a driver 2, and a reproduced signal is supplied from the driver 2 to a decoder 3. An output from the decoder 3 is supplied to a decoder 4. Audio data, video data and superimpose data are digitally multiplexed and recorded on the disk 1. The decoder 4 separates data received from the decoder 3 into these three kinds of data and supplies them to three decoders 5, 6 and 7.

The decoder 5 separates the audio data input thereto into audio data of three channels and supplies them to three audio decoders 8a, 8b and 8c. Outputs from the audio decoders 8a to 8c are supplied to a synthesizer 11. The decoder 6 separates the video data input thereto into video data of three channels and supplies them to three video decoders 9a, 9b and 9c. Outputs from the video decoders 9a to 9c are supplied to a synthesizer 12. The decoder 7 separates the superimpose data input thereto into superimpose data of three channels and supplies them to three data decoders 10a, 10b and 10c. Outputs from the data decoders 10a to 10c are supplied to the synthesizer 12.

A controller 13 controls the decoder 3, the decoders 4 to 7, the audio decoders 8a to 8c, the video decoders 9a to 9c, the data decoders 10a to 10c, and the synthesizers 11 and 12. Further, the controller 13 receives output signals from them. An input device 14 such as a keyboard or a remote controller is operated when a desired command is input into the controller 13. A display 15 performs display corresponding to the command input from the input device 14.

Figure 2:
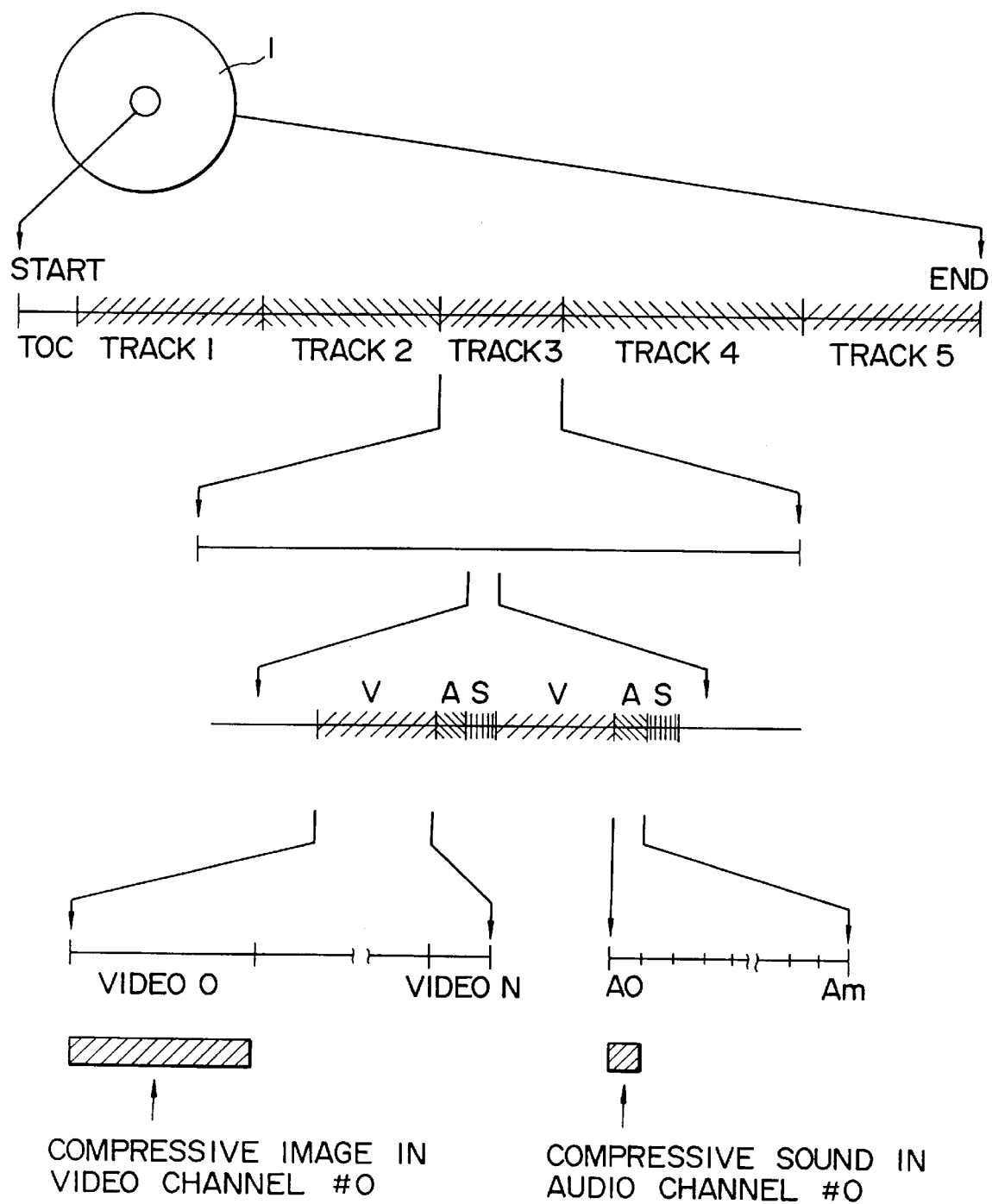
FIG. 2 is a schematic illustration of an example of a format of a disk as the information recording medium in the first preferred embodiment shown in FIG. 1.

FIG. 2 shows a format of the disk 1. TOC information is recorded at a start point of the disk 1 (i.e., an innermost track of the disk 1), and in succession thereto five kinds of information are recorded on a track #1 (information #1) to a track #5 (information #5) in this preferred embodiment. On each of these tracks #1 to #5, there are recorded so as to be time-division multiplexed the video data (V), the audio data (A) and the superimpose data (S). The video data is composed of time-division multiplexed data of N channels (e.g., three channels). Similarly, the audio data is composed of time-division multiplexed data of M channels (e.g., three channels). Although not shown, the superimpose data is also composed of time-division multiplexed data of P channels (e.g., three channels).

The TOC information contains address positions of a start point and an end point of each of the tracks #1 to #5 and also contains a reproduction time of each track. Further, the TOC information contains a default value of a synthesis method how the data of the plural channels in each track are to be synthesized. For example, the synthesis method is a method of obtaining a desired image on a screen by displaying an image of a channel #0 as a background on the screen and displaying images of channels #1 and #2 at a left upper portion and a right lower portion of the screen in a picture-in-picture fashion, or by selecting an image of a desired channel only.

Figure 3:
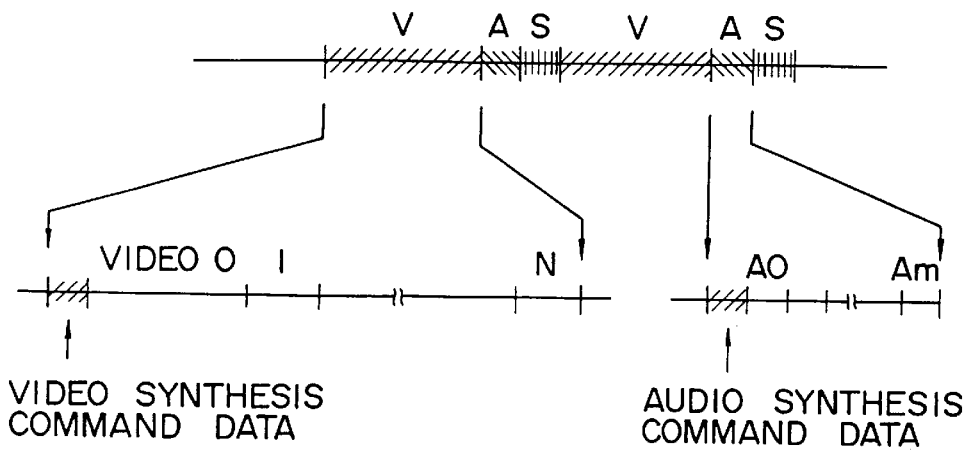
FIG. 3 is a schematic illustration of another example of the format of the disk.

The default synthesis method may be recorded at a header portion of each of video, audio and superimpose blocks on each track as shown in FIG. 3. That is, in this preferred embodiment, video synthesis command data is recorded at the header portion of the video block where the video data of each of the N channels is recorded. Similarly, audio synthesis command data is recorded at the header portion of the audio block where the audio data of each of the M channels is recorded. Although not shown, superimpose synthesis command data is also recorded at the header portion of the superimpose block where the superimpose data of each of the P channels is recorded.

Now, the operation of the preferred embodiment shown in FIG. 1 now be described. When the disk 1 is loaded into the drive 2, the drive 2 reproduces the TOC information from the disk 1 and outputs the same to the decoder 3. The decoder 3 reads the TOC information in the disk 1 and outputs the same to the controller 13.

When the input device 14 is operated to input a command of reproduction, the drive 2 starts reproduction of the disk 1. The decoder 3 supplies data reproduced from each track to the decoder 4. The decoder 4 separates the data input thereto into audio data, video data and superimpose data, and respectively supplies them to the decoders 5 to 7.

The decoder 5 separates the audio data input thereto into audio data of three channels, and respectively supplies them to the audio decoders 8a to 8c. The audio decoders 8a to 8c decode the audio data input thereto and output the decoded audio data to the synthesizer 11. Thus, the audio data of three channels are input to the synthesizer 11.

On the other hand, the decoder 6 separates the video data input thereto into video data of three channels, and respectively supplies them to the video decoders 9a to 9c. The video decoders 9a to 9c decode the video data input thereto and output the decoded video data to the synthesizer 12. Similarly, the decoder 7 separates the superimpose data input thereto into superimpose data of three channels, and respectively supplies them to the data decoders 10a to 10c. The data decoders 10a to 10c decode the superimpose data input thereto and output the decoded superimpose data to the synthesizer 12. Thus, the video data of three channels and the superimpose data of three channels are input to the synthesizer 12.

The synthesizer 11 synthesizes the audio data input thereto according to a synthesis method designated by the controller 13, and outputs the synthesized audio data. Similarly, the synthesizer 12 synthesizes the video data and the superimpose data input thereto according to the synthesis method designated by the controller 13. The synthesis method is decided by the controller 13 according to the flowchart as shown in FIG. 4, for example.

Figure 4:
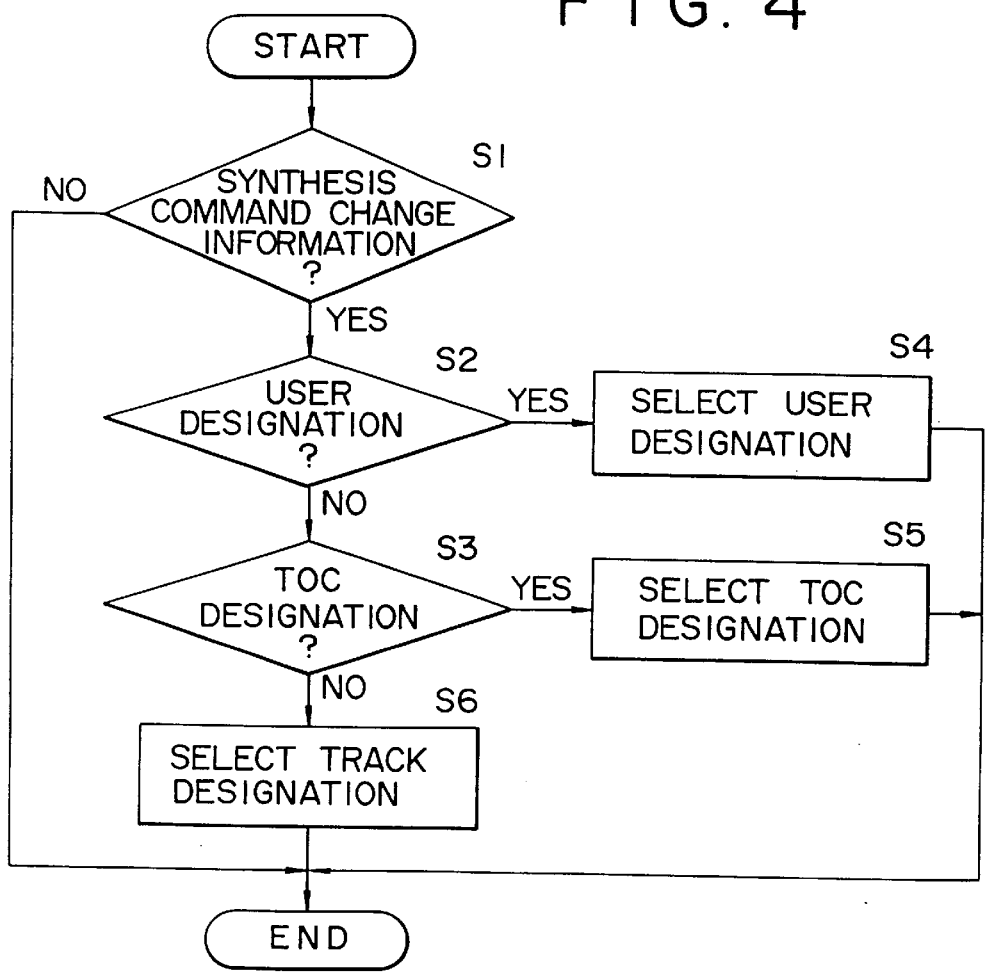
FIG. 4 is a flowchart illustrating a method of deciding a synthesis method in the first preferred embodiment shown in FIG. 1.

Referring to FIG. 4, it is determined in step S1 whether or not synthesis command change information is present. If it is determined in step S1 that the synthesis command change information is present, the program proceeds to step S2, and it is determined in step S2 whether or not the synthesis command has been designated by a user. If the input device 14 is operated by the user to command the controller 13 to designate the synthesis method for each channel, the program proceeds to step S4, and this designation by the user is preferentially selected. In other words, the synthesizers 11 and 12 perform synthesis of data according to the command from the input device 14.

In step S2, if it is determined that the designation by the user is not present, the program proceeds to step S3, and it is determined in step S3 whether or not the designation of the synthesis command has been derived from the TOC information. That is, the controller 13 determines whether or not synthesis command change information is present, from the TOC information supplied from the decoder 3, and if the controller 13 determines that the synthesis command change information is present, the program proceeds to step S5, and the designation by the TOC information is selected. Then, the synthesis method designated by the TOC information is set in the synthesizers 11 and 12.

In step S3, if the synthesis command change information is not contained in the TOC information, the program proceeds to step S6. In this case, the synthesis method designated in each track as shown in FIG. 3 is selected, and it is set in the synthesizers 11 and 12.

In this way, if the designation by the user is present, the synthesis method designated by the user is preferentially set, while if the designation by the user is not present, the synthesis method is set according to the TOC information or the track in this priority order.

Figure 5:
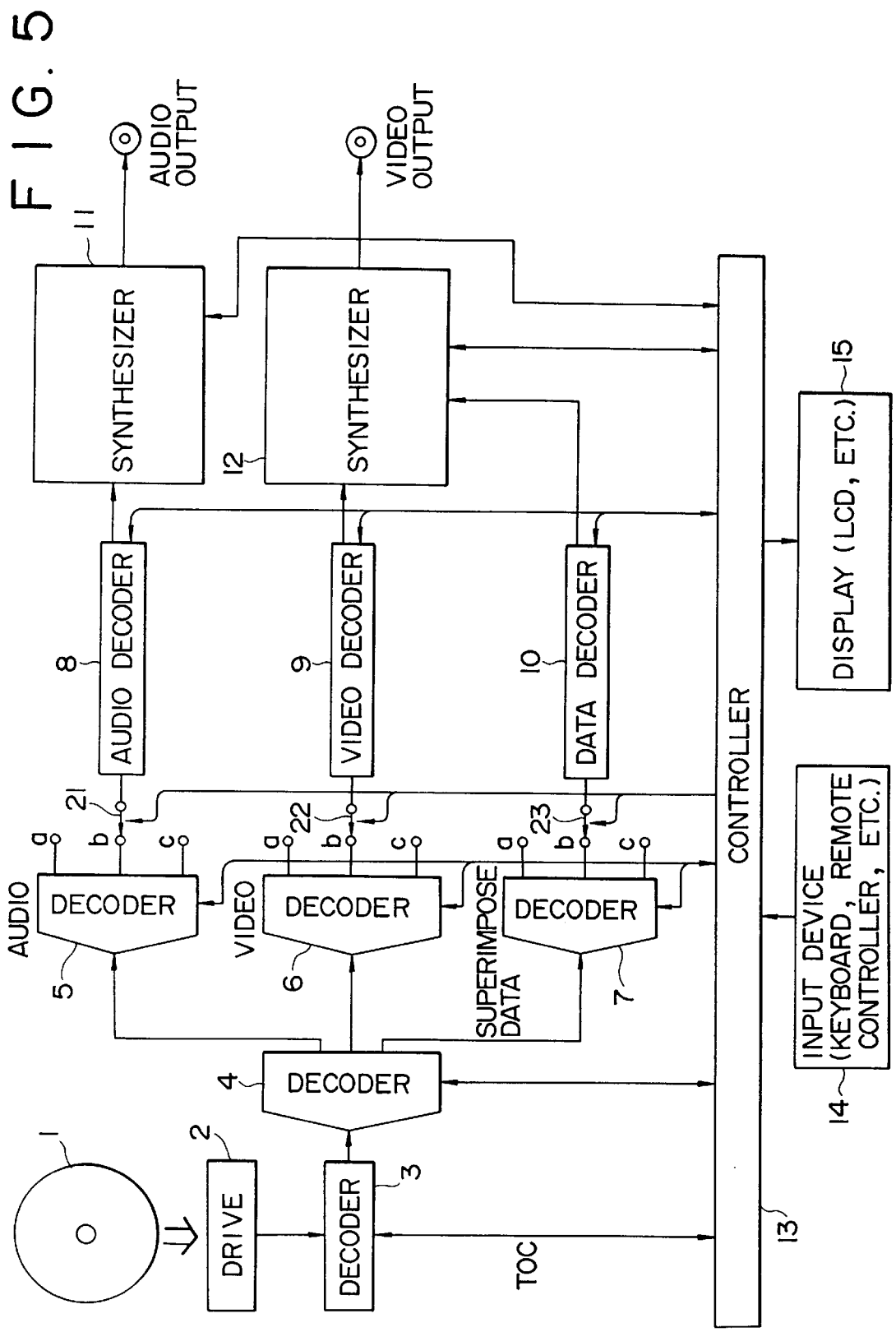
FIG. 5 is a block diagram showing a construction of a second preferred embodiment of the information reproducing device according to the present invention.

FIG. 5 is a block diagram showing a construction of a second preferred embodiment of the information reproducing device according to the present invention, in which the same reference numerals as those shown in FIG. 1 designate the same or like parts, and the explanation thereof will be omitted hereinafter. In the second preferred embodiment, an audio decoder 8, a video decoder 9 and a data decoder 10 each for one channel are provided. One of audio data of three channels output from the decoder 5 is selected by a switch 21, and is supplied to the audio decoder 8. Similarly, one of video data of three channels output from the decoder 6 is selected by a switch 22, and is supplied to the video decoder 9. Similarly, one of superimpose data of three channels output from the decoder 7 is selected by a switch 23, and is supplied to the data decoder 10. The construction of the other parts is the same as that shown in FIG. 1.

In this manner, each of the decoders 8, 9 and 10 for respectively decoding the audio data, the video data and the superimpose data is provided for one channel only. Accordingly, these data of a desired channel are selected by the switches 21, 22 and 23 from the data of three channels output from the decoders 5, 6 and 7, and are supplied to the decoders 8, 9 and 10, respectively. In other words, each of the switches 21 to 23 function as a kind of synthesizer.

Figure 6:
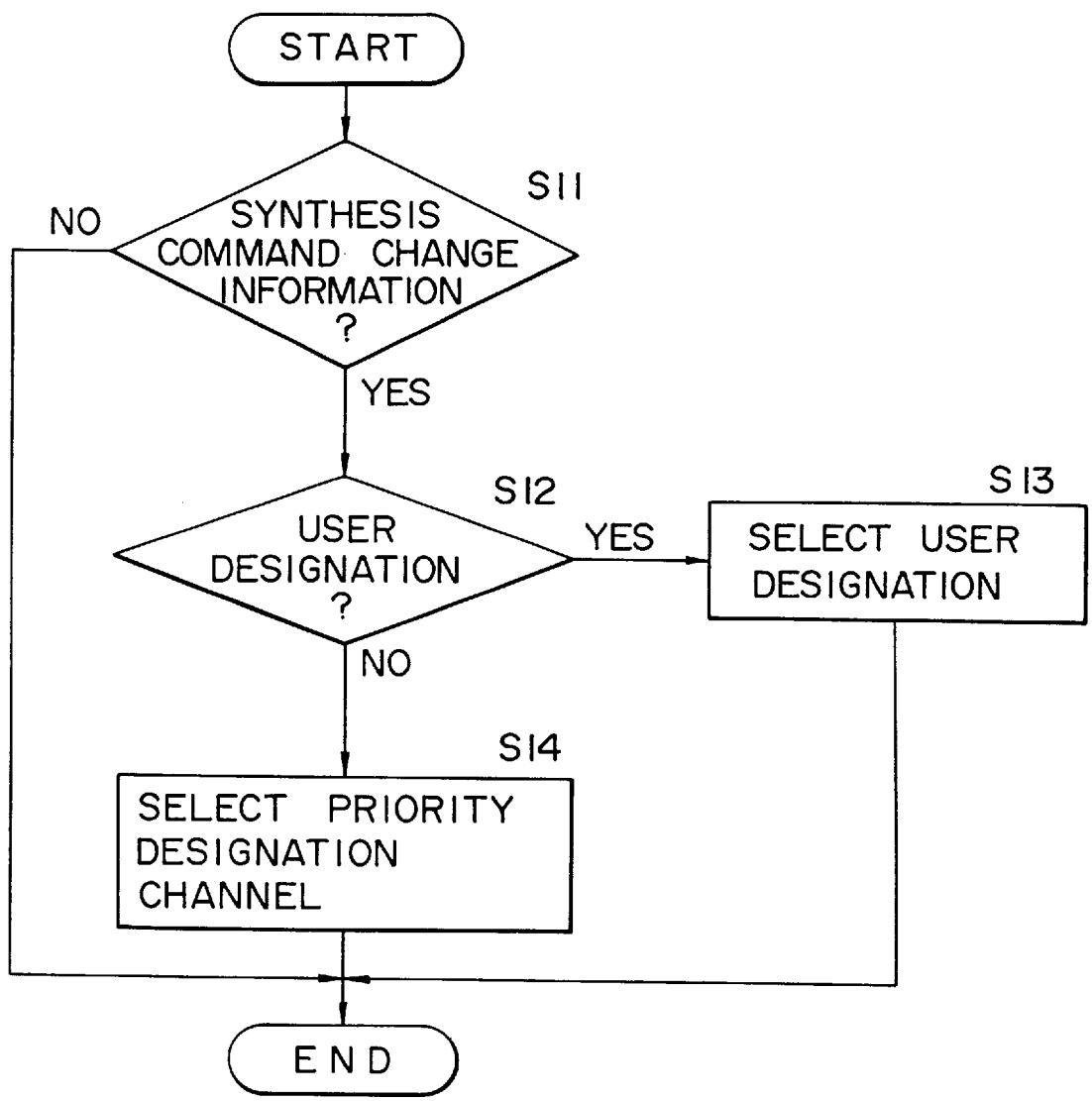
FIG. 6 is a flowchart illustrating a method of deciding a synthesis method in the second preferred embodiment shown in FIG. 5.

In the second preferred embodiment, the synthesis method is decided according to the flowchart as shown in FIG. 6. That is, in step S11, it is determined whether or not synthesis command change information is present. If it is determined that the synthesis command change information is present, the program proceeds to step S12. In step S12, it is determined whether or not this information has been designated by the user through the input device 14. If a desired synthesis method is designated by the user, the program proceeds to step S13, and this designated synthesis method is selected. Then, the controller 13 controls the switches 21 to 23 and the synthesizers 11 and 12 according to the designation by the user.

If it is determined in step S12 that the designation by the user is not present, the program proceeds to step S14. In step S14, a channel previously designated to be processed most preferentially is selected. Then, the synthesis for this selected channel only is performed by a predetermined method. The designation of the priority channel is previously recorded as the TOC information or the control information at the header portion of each block of each track, and the TOC information or the control information is read from an output from the decoder 3 or outputs from the decoders 5 to 7.

Figure 7:
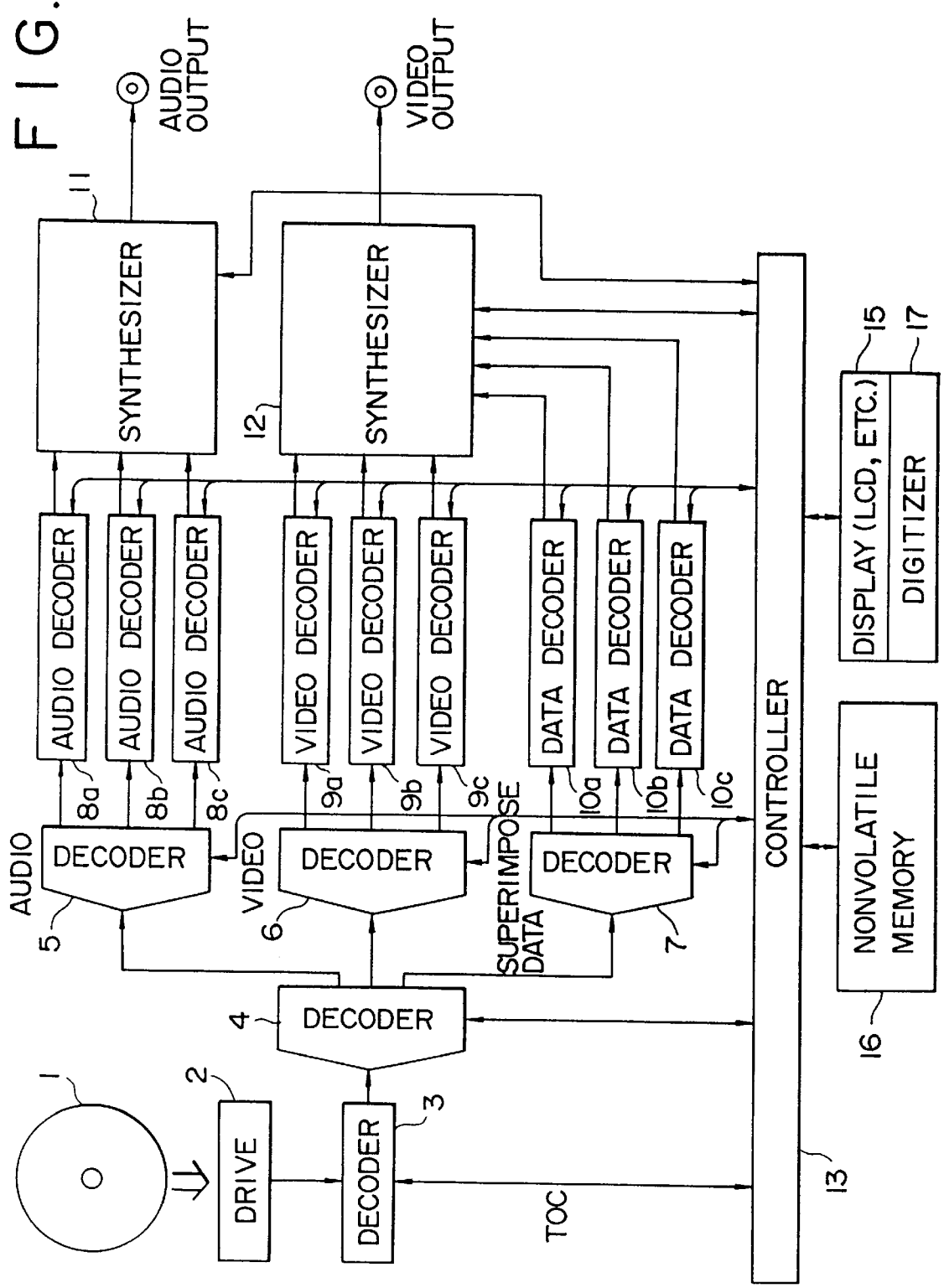
FIG. 7 is a block diagram showing a construction of a third preferred embodiment of the information reproducing device according to the present invention.

FIG. 7 is a block diagram showing a construction of a third preferred embodiment of the information reproducing device according to the present invention. A disk 1 loaded into a drive 2, and information recorded in the disk 1 is reproduced by the drive 2. A decoder 3 decodes a reproduced signal output from the drive 2. The decoder 3 supplies TOC information in the reproduced signal to a controller 13 and also supplies reproduced data from each track to a decoder 4. The decoder 4 reads data recorded at a header portion of each track from the reproduced data received, and supplies the read data to the controller 13. Further, the decoder 4 separates the reproduced data from each track into audio data, video data and superimpose data, and supplies these data to decoders 5, 6 and 7, respectively.

The decoder 5 reads data recorded at an audio header portion (multiplex header portion) from the audio data received, and supplies the read data to the controller 13. Further, the decoder 5 separates packet data following the data recorded at the audio header portion into plural channels, and supplies the separated data to audio decoders 8a, 8b and 8c, respectively.

Similarly, the decoder 6 reads data recorded at a video header portion (multiplex header portion) from the video data received, and supplies the read data to the controller 13. Further, the decoder 6 separates packet data following the data recorded at the video header portion into plural channels, and supplies these separated data to video decoders 9a, 9b and 9c, respectively. Similarly, the decoder 7 reads data recorded at a superimpose header portion (multiplex header portion) from the superimpose data received, and supplies the read data to the controller 13. Further, the decoder 7 separates packet data following the data recorded at the superimpose header portion into plural channels, and supplies these separated data to data decoders 10a, 10b and 10c, respectively.

Each of the audio decoders 8a to 8c reads data recorded at an audio packet header portion from the audio packet data received, and outputs the read data to the controller 13. Further, each of the audio decoders 8a to 8c decodes data recorded at an audio data portion following the audio packet header portion, and outputs the decoded data to a synthesizer 11. Similarly, each of the video decoders 9a to 9c reads data recorded at a video packet header portion from the video packet data received, and outputs the read data to the controller 13. Further, each of the video decoders 9a to 9c decodes data recorded at a video data portion following the video packet header portion, and outputs the decoded data to a synthesizer 12. Similarly, each of the data decoders 10a to 10c reads data recorded at a superimpose packet header portion from the superimpose packet data received, and outputs the read data to the controller 13. Further, each of the data decoders 10a to 10c decodes data recorded at a superimpose data portion following the superimpose packet header portion, and outputs the decoded data to the synthesizer 12.

The synthesizer 11 is controlled by the controller 13 to synthesize the outputs from the audio decoders 8a to 8c and output a synthesized signal to a speaker or the like (not shown). The synthesizer 12 synthesizes the video data supplied from the video decoders 9a to 9c and the superimpose data supplied from the data decoders 10a to 10c according to a control signal supplied from the controller 13, and outputs a synthesized signal to a CRT or the like (not shown). Each of the synthesizers 11 and 12 operates to select one of plural inputs or synthesize a certain input with other inputs.

A display 15 and a digitizer 17 are integrated together to constitute a touch panel. That is, a predetermined switch button or the like is displayed on the display 15. When the switch button thus displayed is touched with a finger or the like, a coordinate position of the switch button touched is detected by the digitizer 17, and a detection signal from the digitizer 17 is output to the controller 13. Accordingly, when a user touches a desired position on the digitizer 17, the user can input a desired command to the controller 13. Further, a nonvolatile memory 16 is provided to store predetermined default values.

Figure 8:
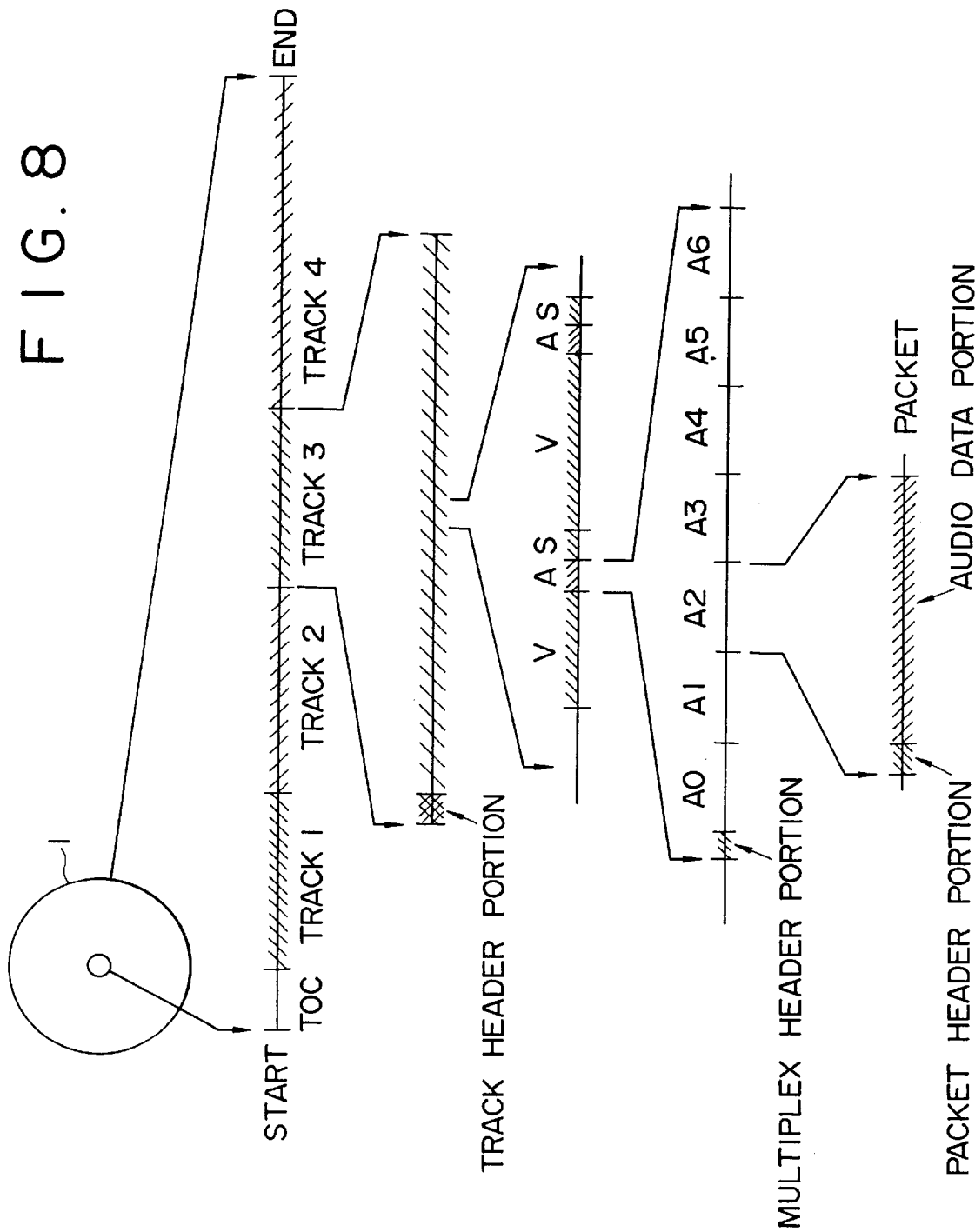
FIG. 8 is a schematic illustration of a format of a disk in the third preferred embodiment shown in FIG. 7.

FIG. 8 schematically illustrates a format of the disk 1. TOC information is recorded at a start point (i.e., on an innermost track) of the disk 1, and predetermined information is recorded on the other tracks subsequent to the start point. In this preferred embodiment, four kinds of information are recorded on tracks #1 to #4, respectively. Each of the tracks #1 to #4 is constituted of a track header portion and a data portion subsequent to the track header portion. In the data portion, each of the video data (V), the audio data (A) and the superimpose data (S) is time-division multiplexed. The audio data is constituted of an audio header portion and an audio data portion of plural channels (e.g., seven channels in this preferred embodiment) subsequent to the audio header portion, which data portion is time-division multiplexed. The plural channels correspond to plural packets. Each of the plural packets is constituted of a packet header portion and an audio data portion.

Similarly, the video data is constituted of a video header portion and a video data portion of plural channels (packets) subsequent to the video header portion, which data portion is time-division multiplexed. Each packet is constituted of a packet header portion and a video data portion. Similarly, the superimpose data is constituted of a superimpose header portion and a superimpose data portion of plural channels (packets) subsequent to the superimpose header portion, which data portion is time-division multiplexed. Each packet is constituted of a packet header portion and a superimpose data portion.

In the TOC information recording portion, the track header portion, the multiplex header portion or the packet header portion, there are recorded predetermined codes as shown in FIGS. 9 to 11, for example. That is, in the case that the recorded information is movie, karaoke or music, there is correspondingly recorded a software category number 0, 1 or 2 as shown in FIG. 9.

Furthermore, there are provided predetermined identifier numbers subordinate to each category number. For instance, if the software category is karaoke, there are provided predetermined identifier numbers as shown in FIG. 10 for the audio data of the karaoke. In this preferred embodiment, the identifier numbers are assigned so that stereophonic (L and R) accompaniment is identified by the identifier number 0 or 1, guide is identified by the identifier number 2, model is identified by the identifier number 3, and comments are identified by the identifier number 4.

If the software category is movie, there are provided predetermined identifier numbers as shown in FIG. 11 for the audio data of the movie. In this preferred embodiment, the identifier numbers are assigned so that background sound (L and R) is identified by the identifier number 0 or 1, center sound is identified by the identifier number 2, back sound is identified by the identifier number 3, speech is identified by the identifier number 4, and comments are identified by the identifier number 5. Of course, these identifier numbers or the contents corresponding thereto may be arbitrarily set.

Figure 12:
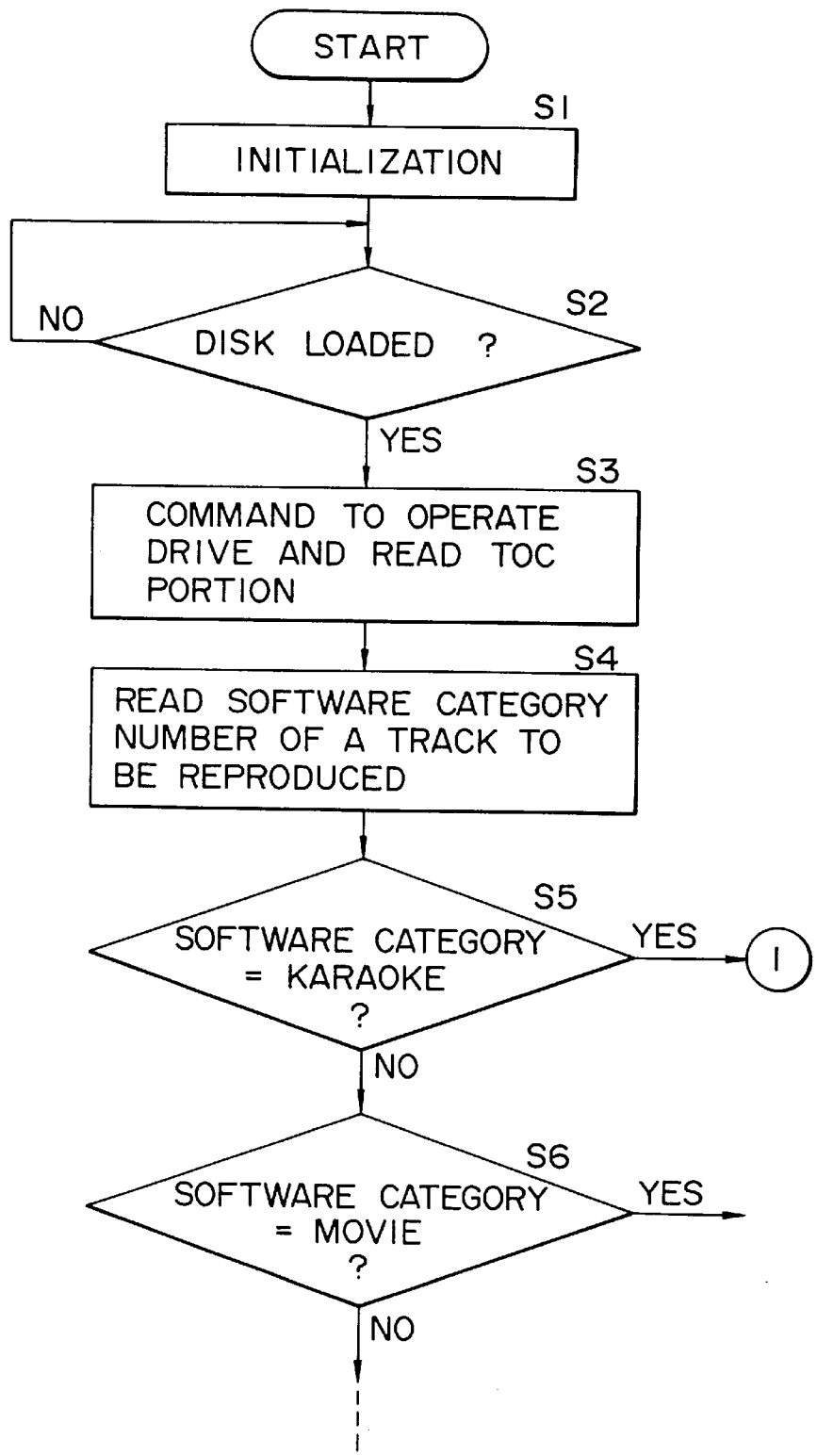

The operation of the preferred embodiment shown in FIG. 7 will now be described with reference to the flowchart shown in FIGS. 12 and 13B. In step S1, initialization is carried out, and then in step S2, it is determined whether or not the disk 1 has been loaded into the drive 2. If the disk 1. is loaded in the drive 2, the controller 13 controls the drive 2 to read the TOC information recorded on the disk 1. The decoder 3 decodes the TOC information output from the drive 2 and outputs the same to the controller 13 (step S3). Then, the controller 13 reads from the TOC information the software category number of the track (information) commanded to be reproduced through the digitizer 17 (step S4). Then, in step S5, S6 and so on, it is determined whether the software category number read above corresponds to karaoke, movie or any other software.

For instance, if the software category number corresponds to karaoke, the processing shown in FIGS. 13A and 13B is executed. That is, the controller 13 controls the display 15 to set the display of a soft switch to the karaoke (step S11). Then, the identifiers of the multiplex audio data are read (step S12), and an operation mode is set according to the result of reading of the identifiers (steps S13 to S18). More specifically, if the identifier number 2 is read, a guide on/off switch is displayed on the display 15 (steps S13 and S14); if the identifier number 3 is read, a model on/off switch is displayed on the display 15 (steps S15 and S16); and if the identifier number 4 is read, a comments on/off switch is displayed on the display 15 (steps S17 and S18). In this way, the display as shown in FIG. 14 is provided on the display 15.

The set condition of these switches set by the processing of steps S13 to S18 in the previous stage is stored in the nonvolatile memory 16, and the set condition in the present stage corresponds to the stored value in the nonvolatile memory 16.

Then, the operation of the guide on/off switch, the model on/off switch and the comments on/off switch displayed as shown in FIG. 14 is determined (steps S19, S21 and S23, respectively), and the synthesizer 11 is controlled so as to select the audio data according to the determination of the operation of these switches (steps S20, S22 and S24, respectively). More specifically, if the guide on/off switch is on, guide sound is selected to be output; if the model on/off switch is on, model is selected to be output; and if the comments on/off switch is on, comments are selected to be output.

If all of the guide on/off switch, the model on/off switch and the comments on/off switch are off, stereophonic accompaniment is selected. The reproduction of the track in the selected operation mode is repeated until a command of ending the reproduction is input (step S25).

For instance, when reproduction of the track #3 is commanded through the digitizer 17 to the controller 13, the controller 13 controls the drive 2 to reproduce the data recorded on the track #3. The reproduced data is supplied through the decoder 3 to the decoder 4 and in turn to the decoders 5 to 7. Then, the decoders 8a to 8c, 9a to 9c and 10a to 10c respectively corresponding to the decoders 5, 6 and 7 decode the audio data, the video data and the superimpose data each having a predetermined number of channels, respectively. While FIG. 7 illustrates three channels by way of example, the number of channels may be set so as to correspond to the number of channels recorded on the disk 1.

In this way, the audio data recorded on the track #3 is input into the synthesizer 11, and the video data and the superimpose data recorded on the track #3 are input into the synthesizer 12. Thereafter, when the user operates the guide on/off switch, for example, to an on state, the synthesizer 11 selects the guide audio data of the input audio data and outputs the same.

While the above description is directed to karaoke by way of example, it is considered that the audio data of movie to be multiplexedly recorded may be translated into different languages for various countries. In such a case, the different languages may be correspondingly identified by identifiers as shown in FIG. 15, for example. In this case, the identifier numbers 0, 1, 2 and 3 correspond to English, French, German and Japanese, respectively. One of the identifier numbers is previously set as a default value (designation information) in the nonvolatile memory 16. For instance, in the products to be exported to USA and UK, the identifier number 0 is set as the default value; in the products to be exported to France, the identifier number 1 is set as the default value; in the products to be exported to Germany, the identifier number 2 is set as the default value; and in the products to be used in Japan, the identifier number 3 is set as the default value.

In reproducing such a recording medium by using the reproducing device of the present invention, the processing as shown in FIG. 16 is executed. First, reproduction of a desired track is commanded through the digitizer 17 (step S31). For instance, when reproduction of the track #3 is commanded, the controller 13 controls the drive 2 to start reproduction of the track #3. The start of reproduction is awaited (step S32). If the reproduction is started, the controller 13 reads the track header from the output from the decoder 4 and reads the number of multiplex sound and language data (step S33). Further, the controller 13 reads default language data from the nonvolatile memory 16 (step S34), and determines whether or not the multiplex audio data contains audio data according with the default language data (step S35). If the audio data accords with the default language data, the controller 13 controls the synthesizer 11 to select the audio data according with the default language data (step S36). If the multiplex audio data does not contain the audio data according with the default language data, the controller 13 controls the synthesizer 11 to select audio data located at the first position in the multiplex audio data (step S37).

In this way, the audio data can be reproduced with a predetermined language in the corresponding country from the same disk without any special operation. Of course, in the case that the user intends to reproduce the audio data with a desired language different from the predetermined language, the user may command the controller 13 to change the default value by operating the digitizer 17 so as to set the default value corresponding to the desired language in the nonvolatile memory 16.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A reproducing apparatus for reproducing information, comprising:

means for reading a recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein said default value is recorded at a table of contents (TOC) information recording portion provided at said start point of said information recording medium; and means for generating data representative of the digital data recorded on the recording medium.

2. A reproducing apparatus for reproducing information, comprising:

means for reading a recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein said information recording medium has a plurality of tracks, each recording said digital data of said plural channels, and said default value is further recorded at a track header portion of each of said tracks; and means for generating data representative of the digital data recorded on the recording medium.

3. A reproducing apparatus for reproducing information, comprising:

means for reading a recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein said digital data comprises at least one kind of video data, audio data and superimpose data, each kind of data having said plural channels time-division multiplexed recorded in the track, and said default value is recorded to designate said synthesis method for said plural channels of each kind of said video data, said audio data and said superimpose data; and means for generating data representative of the digital data recorded on the recording medium.

4. A reproducing apparatus for reproducing information, comprising:

means for reading a recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein the default value indicates a synthesis method for synthesizing data of fewer than all of the plural channels; and means for generating data representative of the digital data recorded on the recording medium.

5. A reproducing method for reproducing information, comprising the step of:

reproducing information from a recording medium, the recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein said default value is recorded at a table of contents (TOC) information recording portion provided at said start point of said information recording medium.

6. A reproducing method for reproducing information, comprising:

reproducing information from a recording medium, the recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein said information recording medium has a plurality of tracks, each recording said digital data of said plural channels, and said default value is further recorded at a track header portion of each of said tracks.

7. A reproducing method for reproducing information, comprising:

reproducing information from a recording medium, the recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein said digital data comprises at least one kind of video data, audio data and superimpose data, each kind of data having said plural channels time-division multiplexed recorded in the track, and said default value is recorded to designate said synthesis method for said plural channels of each kind of said video data, said audio data and said superimpose data.

8. A reproducing method for reproducing information, comprising:

reproducing information from a recording medium, the recording medium including a recording surface having a track on which different types of digital data, each type of digital data having plural channels, are time-division multiplexed recorded, wherein a default value indicative of a synthesis method for how data of said plural channels is to be synthesized, in the absence of any instruction from an operator, is recorded at one or both of a start point of said information recording medium or on said track, wherein the default value indicates a synthesis method for synthesizing data of fewer than all of the plural channels.

* * * * *